United States Patent Office 3,360,338
Patented Dec. 26, 1967

3,360,338
INDICATOR TAPE
Martin I. Edenbaum, Somerset, N.J., assignor to Johnson & Johnson, a corporation of New Jersey
No Drawing. Filed Dec. 24, 1964, Ser. No. 421,079
14 Claims. (Cl. 23—253)

ABSTRACT OF THE DISCLOSURE

An ink solution is disclosed which consists of a solution of selenium dimethyldithiocarbamate and bismuth trioxide (and/or bismuth citrate and/or bismuth subgallate and/or bismuth subnitrate and/or bismuth oxychloride and/or bismuth subcarbonate and/or bismuth subsalicylate and/or lead chromate) and a film forming carrier, preferably vinyl chloride, in an organic solvent, suitably methyl isobutyl ketone. The ink is utilized to form yellow markings on various substrates by evaporating the organic solvent, markings which become red-brown in color when exposed to a moist atmosphere and a temperature of 250° F. for 30 minutes. The ink is therefore particularly adapted for use as or on a device to be attached to articles which are to be steam sterilized, the device indicating whether or not steam sterilization has in fact occurred.

---

The present invention relates to color change indicators and more particularly to color change indicators which effect a color change under sterilization conditions of high temperature and humidity effected during steam sterilization.

In hospitals, clinics and the like, it is standard practice to sterilize various products such as gowns, drapes, sheets, dressings, and other articles, prior to use by placing them in an autoclave where they are subjected to steam sterilization. This practice is necessary to avoid infection and prevent contamination from the use of such articles where the same are not in a sterile condition and is particularly important where the articles have previously been used in the care of other patients. As there is no visual way of determining whether a particular article is sterile or not, it has been the practice to use, with the article, when placed in the steam sterilization chamber, a color change indicator which changes color under the sterilizing conditions of the autoclave, thus indicating that the particular article or package has been passed through the sterilizing cycle. The indicator may be in the form of a ribbon or card to which a color change ink has been applied.

It is generally the practice in sterilizing such articles to gather several articles together, bundling the same in a porous wrap, and then the package, held together by tying with string or by pressure-sensitive adhesive tape, is placed in an autoclave together with a sterilization indicator. The sterilization indicator may be either inserted in or applied to the package. Where pressure-sensitive adhesive tapes are used for this purpose, it is convenient to have the color change indicator on the tape backing. The visible back of the tape holding the package together then indicates whether or not the same has been passed through the sterilization cycle by virtue of its color change. Pressure-sensitive adhesive tapes of this type are, for example, described in U.S. Patent No. 2,889,799.

One of the most commonly used color change markings for this purpose are markings containing sulphur and lead oxide. The sulphur in the presence of the lead oxide, under the conditions of the steam sterilization, changes from a yellow to a black color as it is converted to lead sulfide. It has been the practice to mix the sulphur and the lead oxide together in equivalent molar proportions in an ink base which is then applied to an indicator card or to the back of a pressure-sensitive adhesive tape, which in turn, is then associated with the articles to be sterilized. If the autoclave or other steam sterilizing equipment used is not functioning, or if the package to be sterilized inadvertently gets omitted from being placed in the autoclave, this then can readily be determined by the fact that no reaction has occurred between the sulphur and the lead oxide as shown by the lack of color change in the indicator.

Although giving a good color change from a light yellow to a deep black with fresh inks, the color change indicator markings made from the active ingredients, lead oxide and sulphur, tend to lose much of their sensitivity over extended periods of storage. This is particularly true under relatively hot or humid conditions. As a result, the ink markings tend to darken appreciably in storage. Also, markings do not turn to the same deep black on being subjected to sterilizing conditions but tend to assume a dark gray appearance, with the result that the color change is not nearly as marked as with fresh inks. The sulphur in the ink also tends to sublime during storage, thus removing part of the sulphur content and further reducing the effectiveness of the ink as a color change indicator. Another difficulty with the conventional sulphur lead oxide color change inks is that they are relatively unstable, necessitating the practice of forming separate solutions of the sulphur and the lead oxide and then combining the two together just prior to using the ink for marking. This is apparently due to the fact that the sulphur and lead oxide tend to react while in the solvent medium used in forming the ink. If the ink solution is prepared several days prior to its use, a substantial reduction in color change sensitivity results.

Where the color change indicator is to be used in combination with a pressure-sensitive adhesive tape, as by printing the ink on the back of the tape, the inks containing the sulphur have the further disadvantage that the sulphur in the marking tends to migrate into the pressure-sensitive adhesive where the tape is wound on itself in roll form, thus further reducing the sensitivity of the marking to color change when the tape, with the ink marking thereon, is later exposed to steam sterilization conditions.

Despite these inherent disadvantages in color change markings using sulphur and lead oxide such markings have continued to be used as steam sterilization indicators as they were still superior to other known color change indicators for indicating steam sterilization.

It is an object of the present invention to make color change indicators which will give a marked color change under steam sterilizing conditions and which are stable over extended periods of storage under normal atmospheric conditions. It is a further object of the present invention to make color change indicators which will give a distinct color change when subjected to steam only under conditions that will give effective sterilization. It is a still further object of the present invention to prepare inks in which the color change pigments are stable for extended periods of time while still in the liquid ink medium and from which markings can be made which are stable to color change under normal atmospheric conditions. It is still a further object of the present invention to prepare color change markings free from the deficiencies previously mentioned which are present in color change markings in which free sulphur and litharge are the primary active ingredients. Other objects and advantages of this invention will become apparent from the following description wherein are set forth by way of illustration and example certain embodiments hereof.

It has now been discovered that excellent color change markings can be made by having in the marking, as the active color change ingredients, an intimate mixture of selenium dimethyldithiocarbamate with at least one of the compounds bismuth citrate, bismuth oxychloride, bismuth subcarbonate, bismuth subgallate, bismuth subsalicylate, bismuth trioxide, bismuth subnitrate and lead chromate.

It has been found that when a marking is made from a mixture of selenium dimethyldithiocarbamate, with any compound of the group previously mentioned, in a steam permeable colorless carrier a strong contrasting color change occurs under steam sterilizing conditions. There appears to be no critical ratio of the selenium dimethyldithiocarbamate to the other active color change compound. The best results are obtained, however, where the dimethyldithiocarbamate is present in amounts of 0.5 to 2 molar equivalent parts by weight for each part by weight of the other color change compound. The color change obtained when the markings are subjected to a steam environment for half an hour, is given in the following table. It will be noted that no appreciable color change occurs at 215° F.

carrier in making up the ink solution. Methyl isobutyl ketone, hereinafter referred to as MIBK, is an excellent solvent for this purpose particularly where the film-forming resin carrier is of the vinyl resin type.

The film-forming resin carrier used must be one which is permeable to steam in order to obtain a satisfactory color change under steam sterilizing conditions. Where the resin film-forming carrier does not of itself have sufficient permeability to steam, it can be made satisfactorily permeable by adding to the ink a small amount of wetting agent of either the anionic or cationic type. Nonionic wetting agents do not appear to be satisfactory for this purpose.

One of the substantial advantages of the color change inks of the present invention is that in order to get a good color change it is necessary to heat the ink markings to a temperature of appreciably above 215° F. in a steam environment. If heated, for example, only to 215° F. for 30 minutes, the desired color change is not obtained.

As autoclave temperatures sometimes drop substantially below 250° F., with the result that articles autoclaved are not properly sterilized, this feature of the present inks provides a means of checking the efficiency of the autoclave, or other steam sterilizing apparatus, besides assuring that the articles so marked have been subjected to proper sterilizing conditions. One of the difficulties with many color change indicators used, prior to the present invention, was that they would give color changes when passed through autoclaves which were not operating at satisfactory sterilization conditions. The color change obtained thus indicated only that the article had been subjected to steam in the autoclave, but not that it had been subjected to conditions satisfactory for sterilizing purposes.

As the color change indicator of the present invention

TABLE.—COLOR CHANGE IN STEAM ENVIRONMENT

| Composition of Marking | Initial Color | Color After 30 minutes at 215° F. | Color After 30 minutes at 250° F. |
| --- | --- | --- | --- |
| Selenium dimethyldithiocarbamate+bismuth citrate | Yellow | Yellow | Dark Red-Brown. |
| Selenium dimethyldithiocarbamate+bismuth oxychloride | do | do | Do. |
| Selenium dimethyldithiocarbamate+bismuth subcarbonate | do | do | Do. |
| Selenium dimethyldithiocarbamate+bismuth subgallate | do | Light Tan | Dark Brown. |
| Selenium dimethyldithiocarbamate+bismuth subsalicylate | do | Yellow | Dark Red-Brown. |
| Selenium dimethyldithiocarbamate+bismuth trioxide | do | do | Do. |
| Selenium dimethyldithiocarbamate+bismuth subnitrate | do | Red-Yellow | Do. |
| Selenium dimethyldithiocarbamate+lead chromate | Orange-Yellow | Orange-Yellow | Do. |

The color change ingredients, or pigments, are applied in an ink base containing a film-forming carrier for anchoring the color change pigments to a substrate after the solvent medium used in the ink has evaporated. Although various film-forming resins may be used for this purpose, a vinyl resin carrier such, for example, as Bakelite Resin VYHH, a copolymer of polyvinyl chloride and polyvinyl acetate, has been found to be particularly suitable. The concentration in the ink of the color change pigments with respect to the amount of film-forming resin used is not particularly critical. However, they should be sufficient to give a clearly visible marking. In the preferred practice, the color change pigment is present in amounts of about 2 to 4 parts by weight per part by weight of the resin carrier. By color change pigment is meant equal molar equivalents of the selenium dimethyldithiocarbamate and a compound of the group bismuth citrate, bismuth oxychloride, bismuth subcarbonate, bismuth subgallate, bismuth subsalicylate, bismuth trioxide, bismuth subnitrate and lead chromate. There is no particular criticality as to the proportion of the selenium dimethyldithiocarbamate to the other active bismuth or lead compounds of the group mentioned.

Any solvent may be used for the resin film-forming is quite stable to dry heat, even at temperatures as high as 375° F., the color change inks are well suited for the preparation of temperature indicator tapes of the type described in Patent No. 2,889,799, where the pressure-sensitive adhesive of the tape is a heat cured pressure-sensitive adhesive where curing is to be done prior to use of the tape. As curing temperatures for such pressure-sensitive adhesives is frequently as high as 300° F., any color change indicator not showing substantial stability under dry heat conditions at such temperature is not fully satisfactory as a substantial amount of the sensitivity to color change of the ink is lost during the curing of the pressure-sensitive adhesives. The color change indicator inks of the present invention are thus particularly well suited for the preparation of temperature indicator pressure-sensitive adhesive tapes wherein the color change indicator is carried by the tape.

As the color change is from a light yellow or orange to a dark brown or red brown, the change in color is readily identified and clearly points out to the user whether or not the sterilizing conditions have been met.

The invention is further illustrated by the following examples which are given for the purposes of illustration only, the invention not being limited thereto.

EXAMPLE I

A vehicle of the following formulation is prepared:

|  | Parts |
|---|---|
| Bakelite resin VYHH | 1.0 |
| MIBK (methyl isobutyl ketone, solvent) | 2.75 |

"Parts" where used, refers to parts by weight. The following pigments are ground into 100 parts of this vehicle on a three roll ink mill:

|  | Parts |
|---|---|
| Bismuth trioxide | 15 |
| Selenium dimethyldithiocarbamate | 35 |

This paste is diluted with an equal weight of MIBK to give an ink of good printing viscosity.

The ink so prepared is gravure printed on a 30# stock paper which has been surface coated with a white pigmented nitro-cellulose lacquer. The print roll used is engraved with a pattern of small diamonds arranged in straight rows running at an angle of 60° to the direction of travel of the paper. A 56-line screen is used to etch the diamond pattern. The printed sheet is passed through a drying oven set at 150° F. to flash off the solvent.

In subsequent steps, the printed paper is top coated with a release coating of Quilon, a water soluble Werner-type chrome complex dissolved in isopropanol and described in Du Pont bulletin "Quilon Chrome Complex," Bulletin #A18204. The sheet is then mass coated on the opposite side with a pressure-sensitive adhesive of the conventional rubber base type. In both steps, drying temperatures of 200–250° F. for one minute are used.

Pressure-sensitive tape prepared in the manner described is cut into one-inch widths, is placed in storage at normal atmospheric conditions (RT storage) and in a room kept at 120° F. The tape samples are tested at regular intervals for eight months, with the following results:

| Months in Storage | Ink Color Before Autoclaving | Ink Color After Autoclaving, 250° F., 30 min. |
|---|---|---|
| RT Storage: |  |  |
| 0 | Yellow | Red-Brown. |
| 1 | ----do---- | Do. |
| 3 | ----do---- | Do. |
| 4 | ----do---- | Do. |
| 8 | ----do---- | Do. |
| 120° F. Storage: |  |  |
| 0 | ----do---- | Do. |
| 1 | ----do---- | Do. |
| 3 | ----do---- | Do. |
| 4 | ----do---- | Do. |
| 8 | ----do---- | Do. |

Pressure-sensitive tape prepared in the manner described printed with an ink containing the reactive compound bismuth trioxide and selenium dimethyldithiocarbamate, cut into one inch widths, is tested for color change in a stream autoclave for 30 minutes at both a low or non-sterlizing temperature of 215° F. and a high or sterilizing temperature of 250° F., with the following results:

Color after autoclaving at 215° F., yellow; at 250° F., red-brown. Initial color, yellow.

EXAMPLE II

A vehicle of the following formulation is prepared:

|  | Parts |
|---|---|
| Bakelite resin VYHH | 1.0 |
| MIBK | 2.75 |

The following pigments are ground into 100 parts of this vehicle on a three roll ink mill:

|  | Parts |
|---|---|
| Bismuth oxychloride | 16 |
| Selenium dimethyldithiocarbamate | 50 |

This paste is diluted with an equal weight of MIBK to give an ink of good printing viscosity.

Using this ink pressure-sensitive adhesive coated paper strips printed with the ink are prepared as in Example I using the same paper stock, release coating and pressure-sensitive adhesive.

Tapes so prepared printed with ink containing the reactive compounds bismuth oxychloride and selenium dimethyldithiocarbamate cut into one inch widths, are placed in a storage at normal atmospheric conditions (RT storage) and in a room kept at 120° F. The tape samples are tested at regular intervals for eight months, with the following results:

| Months in Storage | Ink Color Before Autoclaving | Ink Color After Autoclaving, 250° F., 30 min. |
|---|---|---|
| RT Storage: |  |  |
| 0 | Yellow | Red-Brown. |
| 1 | ----do---- | Do. |
| 3 | ----do---- | Do. |
| 4 | ----do---- | Do. |
| 8 | ----do---- | Do. |
| 120° F. Storage: |  |  |
| 0 | ----do---- | Do. |
| 1 | ----do---- | Do. |
| 3 | ----do---- | Do. |
| 4 | ----do---- | Do. |
| 8 | ----do---- | Do. |

Pressure-sensitive tape prepared in the manner described printed with an ink containing the reactive compound bismuth trioxide and selenium dimethyldithiocarbamate, cut into one inch widths, is tested for color change in a steam autoclave for 30 minutes at both a low or non-sterilizing temperature of 215° F. and a high or sterilizing temperature of 250° F., with the following results:

Color after autoclaving at 215° F., yellow; at 250° F., red-brown. Initial color, yellow.

Tapes are prepared with the other active ingredients heretofore disclosed and tested in similar manner with similar results.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described my invention, I claim:

1. In a steam sterilization indicating device of the type comprising a base and containing markings thereon which change color when exposed to the conditions of steam sterilization, the improvement comprising: said marking comprising a steam permeable carrier film containing an intimate mixture of selenium dimethyldithiocarbamate with at least one material of the group consisting of bismuth citrate, bismuth oxychloride, bismuth subcarbonate, bismuth subgallate, bismuth subsalicylate, bismuth trioxide, bismuth subnitrate and lead chromate.

2. A device of claim 1 in which the material of said group is bismuth citrate.

3. A device of claim 1 in which the material of said group is bismuth oxychloride.

4. A device of claim 1 in which the material of said group is bismuth subcarbonate.

5. A device of claim 1 in which the material of said group is bismuth subgallate.

6. A device of claim 1 in which the material of said group is bismuth subsalicylate.

7. A device of claim 1 in which the material of said group is bismuth trioxide.

8. A device of claim 1 in which the material of said group is bismuth subnitrate.

9. A device of claim 1 in which the material of said group is lead chromate.

10. A device of claim 1 in which said carrier is a vinyl film.

11. A device of claim 10 in which said carrier is a copolymer of polyvinyl chloride and polyvinyl acetate.

12. An ink adapted for forming markings which change color under the conditions of steam sterilization comprising an organic solvent, a film-forming carrier, and color change pigment consisting essentially of a mixture of selenium dimethyldithiocarbamate and at least one material of the group consisting of bismuth citrate, bismuth oxychloride, bismuth subcarbonate, bismuth subgallate, bismuth subsalicylate, bismuth trioxide, bismuth subnitrate and lead chromate.

13. An ink of claim 12 in which said carrier is a vinyl film-forming resin.

14. An ink of claim 13 in which said film-forming resin is a copolymer of polyvinyl chloride and polyvinyl acetate.

References Cited

UNITED STATES PATENTS

| 2,873,234 | 2/1959 | Passal | 204—52 |
| 2,889,799 | 6/1959 | Korpman | 23—253 |
| 3,028,254 | 4/1962 | Grant | 117—368 |

OTHER REFERENCES

Ionescu-Muscell et al., "Chemical Thermoindicator in the Textile Industry," Chem. Abs., vol. 58, February 1963, page 2531.

MORRIS O. WOLK, *Primary Examiner.*

L. MEI, *Assistant Examiner.*